United States Patent [19]
Oba

[11] Patent Number: 5,926,170
[45] Date of Patent: Jul. 20, 1999

[54] REMOTE CONTROL UNIT WITH KEYBOARD COVER AND COVER POSITION DETECTOR

[75] Inventor: Haruo Oba, Kanagawa, Japan

[73] Assignee: Sony Corporation, Tokyo, Japan

[21] Appl. No.: 08/906,476

[22] Filed: Aug. 5, 1997

[30] Foreign Application Priority Data

Aug. 9, 1996 [JP] Japan .............................. P08-226149

[51] Int. Cl.⁶ .................................................. G09G 5/00
[52] U.S. Cl. .......................... 345/168; 345/169; 345/158; 345/160; 341/20; 341/21; 341/22; 341/26; 400/472; 400/490
[58] Field of Search .................................. 345/157–169; 341/20, 21, 22, 26; 400/472, 490

[56] References Cited

U.S. PATENT DOCUMENTS

| | | | |
|---|---|---|---|
| 5,302,968 | 4/1994 | Heberle | 345/131 |
| 5,457,478 | 10/1995 | Frank | 345/158 |
| 5,566,290 | 10/1996 | Silverbrook | 395/152 |
| 5,724,106 | 3/1998 | Autry et al. | 348/734 |
| 5,831,555 | 11/1998 | Yu et al. | 341/26 |

FOREIGN PATENT DOCUMENTS

| | | | |
|---|---|---|---|
| 93108257 | 4/1993 | Japan | G06F 3/033 |
| 94214696 | 8/1994 | Japan | G06F 3/02 |

*Primary Examiner*—Dennis-Doon Chow
*Assistant Examiner*—Amr Awad
*Attorney, Agent, or Firm*—Jay H. Maioli

[57] ABSTRACT

An input apparatus capable of controlling a plurality of electronic devices including a set-top box includes comprises: a first operation key part having a plurality of operation keys; a second operation key part having a plurality of operation keys; a control key part having at least one control key; a control unit for generating operation information for a first electronic device when any operation key of the first operation key part is operated, the control unit further generating operation information for the first electronic device when, with no control key of the control key part operated, any operation key of the second operation key part is operated, the control unit further generating operation information for a second electronic device when, with any control key of the control key part operated, any operation key of the second operation key part is operated; and a transmission unit for transmitting the operation information generated by the control unit.

4 Claims, 16 Drawing Sheets

F I G. 9A
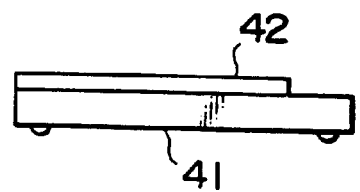
F I G. 9B
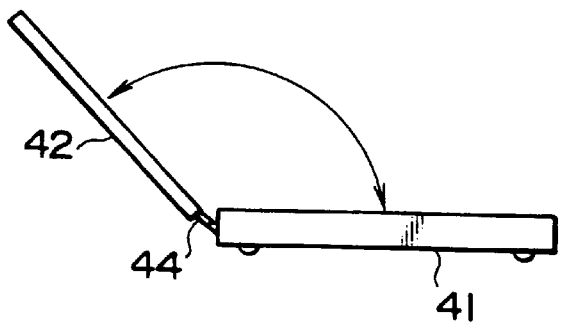
F I G. 9C
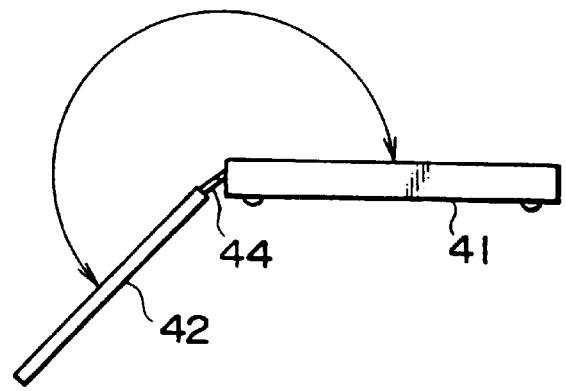
F I G. 9D
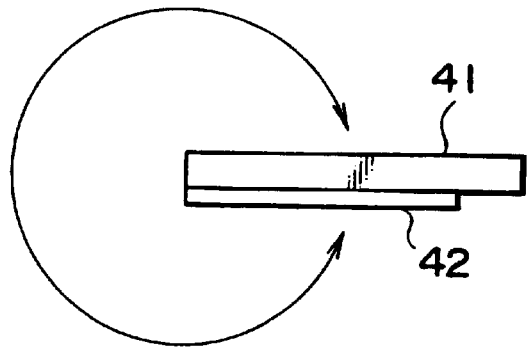

FIG. 13

| KEY NUMBER | INSCRIPTION | CODE |
|---|---|---|
| 1 | ESC | 0 1 |
| 2 | 1 ! ぬ | 0 2 |
| 3 | 2 " ふ | 0 3 |
| 4 | 3 # あ | 0 4 |
| 5 | 4 $ う | 0 5 |
| 6 | 5 % え | 0 6 |
| 7 | 6 & お | 0 7 |
| 8 | 7 ' や | 0 8 |
| 9 | 8 （ゆ | 0 9 |
| 10 | 9 ）よ | 0 A |
| 11 | 0 〜 わ | 0 B |
| 112 | F 1 | 7 0 |
| 113 | F 2 | 7 1 |
| 114 | F 3 | 7 2 |
| 115 | F 4 | 7 3 |
| 116 | F 5 | 7 4 |
| 117 | F 6 | 7 5 |
| 118 | F 7 | 7 6 |
| 119 | F 8 | 7 7 |
| 120 | F 9 | 7 8 |
| 121 | F 10 | 7 9 |
| 122 | F 11 | 7 A |
| 123 | F 12 | 7 B |
| 124 | PRINT SCREEN | 7 C |
| 125 | SCRALL LOCK | 7 D |
| 126 | PAUSE | 7 E |
| 127 |  | 7 F |

REMOTE CONTROL UNIT WITH KEYBOARD COVER AND COVER POSITION DETECTOR

BACKGROUND OF THE INVENTION

1. Field of the Invention

The present invention relates to an input apparatus for controlling a plurality of electronic devices.

2. Description of the Related Art

Coming rapidly into widespread use today are two-way cable systems and computer-based commercial networks including what is known as the Internet utilizing electronic mail (E-mail) and the World Wide Web (WWW). Such networks are no longer limited in their use to computers on the desk top; they are fast finding their way into various electronic devices that make up an audio-visual (AV) system in the household living room. For example, terminal equipment connected to the Internet or like networks for computer communication through telephone lines may be hooked up with a television monitor device. With the terminal connected illustratively to the Internet, the monitor may display text information, graphics and icons.

Control of and text input to such terminal equipment are generally effected by use of a keyboard connected to the terminal via a cable. Some keyboards developed in recent years are capable of transmitting to the connected terminal information generated by key operations in wireless fashion using infrared signals (IR (infrared ray) keyboards).

At present, AV devices are controlled by their respective controllers. If keyboard-controlled terminal equipment of the above-described type is connected to a plurality of AV devices each controlled by a dedicated controller, the user is required to manipulate both the multiple controllers and the keyboard. The operations involved in such cases are complicated and difficult to accomplish.

Many of today's AV devices are equipped with a graphic interface that allows graphics to be displayed illustratively on a connected monitor. The trouble with such setups is that to display graphics, each AV device must be operated with its dedicated controller.

SUMMARY OF THE INVENTION

It is therefore an object of the present invention to overcome the above and other disadvantages of the related art and to improve the related art. In carrying out the invention and according to one aspect thereof, there is provided an input apparatus comprising: a first operation key part having a plurality of operation keys; a second operation key part having a plurality of operation keys; a control key part having at least one control key; control means for generating operation information for a first electronic device when any operation key of the first operation key part is operated, the control means further generating operation information for the first electronic device when, with no control key of the control key part operated, any operation key of the second operation key part is operated, the control means further generating operation information for a second electronic device when, with any control key of the control key part operated, any operation key of the second operation key part is operated; and transmission means for transmitting the operation information generated by the control means.

Preferably, the input apparatus may further comprise a third operation key part having at least one operation key, wherein the control means generates operation information for the second electronic device when any operation key of the third operation key part is operated regardless of whether any control key of the control key part is operated.

In the above preferred structure, the transmission means may preferably transmit the operation information as an infrared signal.

According to another aspect of the invention, there is provided an input apparatus comprising: a first operation key part having a plurality of operation keys; a second operation key part having a plurality of operation keys furnished separately from the first operation key part; control means for generating operation information for a first electronic device when any operation key of the first operation key part is operated, the control means further generating operation information for a second electronic device when any operation key of the second operation key part is operated; and transmission means for transmitting the operation information generated by the control means.

Preferably, the transmission means in the above input apparatus may transmit the operation information as an infrared signal.

According to a further aspect of the invention, there is provided an input apparatus comprising: a first operation key part having a plurality of operation keys; a second operation key part having a plurality of operation keys furnished separately from the first operation key part; cursor operation keys for moving a cursor; control means for generating operation information for a first electronic device when any operation key of the first operation key part is operated, the control means further generating operation information for a second electronic device when any operation key of the second operation key part is operated, the control means further generating operation information for the first and the second electronic devices when any of the cursor operation keys is operated; and transmission means for transmitting the operation information generated by the control means.

Preferably, the control means in the above input apparatus may generate operation information for the first electronic device and operation information for the second electronic device alternately on a time division basis when any of the cursor operation keys is operated. With this structure, the transmission means may preferably transmit the operation information as an infrared signal.

According to an even further aspect of the invention, there is provided an input apparatus comprising: a base; a first operation key part having a plurality of operation keys formed on the base; a cover part attached movably to the base, the cover part covering the first operation key part when set to a first position, the cover part exposing the first operation part and located under the base when set to a second position; a second operation part having a plurality of operation keys and attached to the cover part so as to be exposed when the cover part is set to the first position; control means for generating operation information for a first electronic device when any operation key of the first operation key part is operated, the control means further generating operation information for a second electronic device when any operation key of the second operation key part is operated; and transmission means for transmitting the operation information generated by the control means.

Preferably, the input apparatus may further comprise position determination means for determining whether the cover part is set to the first position or to the second position; wherein, if the position determination means has determined that the cover part is set to the first position, the control means does not generate operation information in response to any operation key of the first operation key part being operated and only generates operation information in response to any operation key of the second operation key part being operated, and wherein, if the position determination means has determined that the cover part is set to the second position, the control means does not generate operation information in response to any operation key of the second operation key part being operated and only generates operation information in response to any operation key of the first operation key part being operated.

Preferably, the transmission means in the above input apparatus may be attached to one edge of the base, with the cover part being mounted pivotably on another edge of the base. With this structure, the transmission means may preferably transmit the operation information as an infrared signal.

The inventive input apparatus has the first operation key part for controlling the first electronic device, the second and third operation key parts for controlling the second electronic device, and/or the cursor operation keys for controlling the first and second electronic devices. The control means generates operation information for the first and second electronic devices and transmits the generated information to the devices.

These and other objects, features and advantages of the invention will become more apparent upon a reading of the following description and appended drawings.

BRIEF DESCRIPTION OF THE DRAWINGS

FIGS. 9A through 9D are views showing the IR keyboard of FIG. 7 with its keyboard cover swung open;

FIG. 13 is a table that lists typical key codes representing the input keys on the key part of the IR keyboard according to the invention;

DESCRIPTION OF THE PREFERRED EMBODIMENTS

Figure 1:
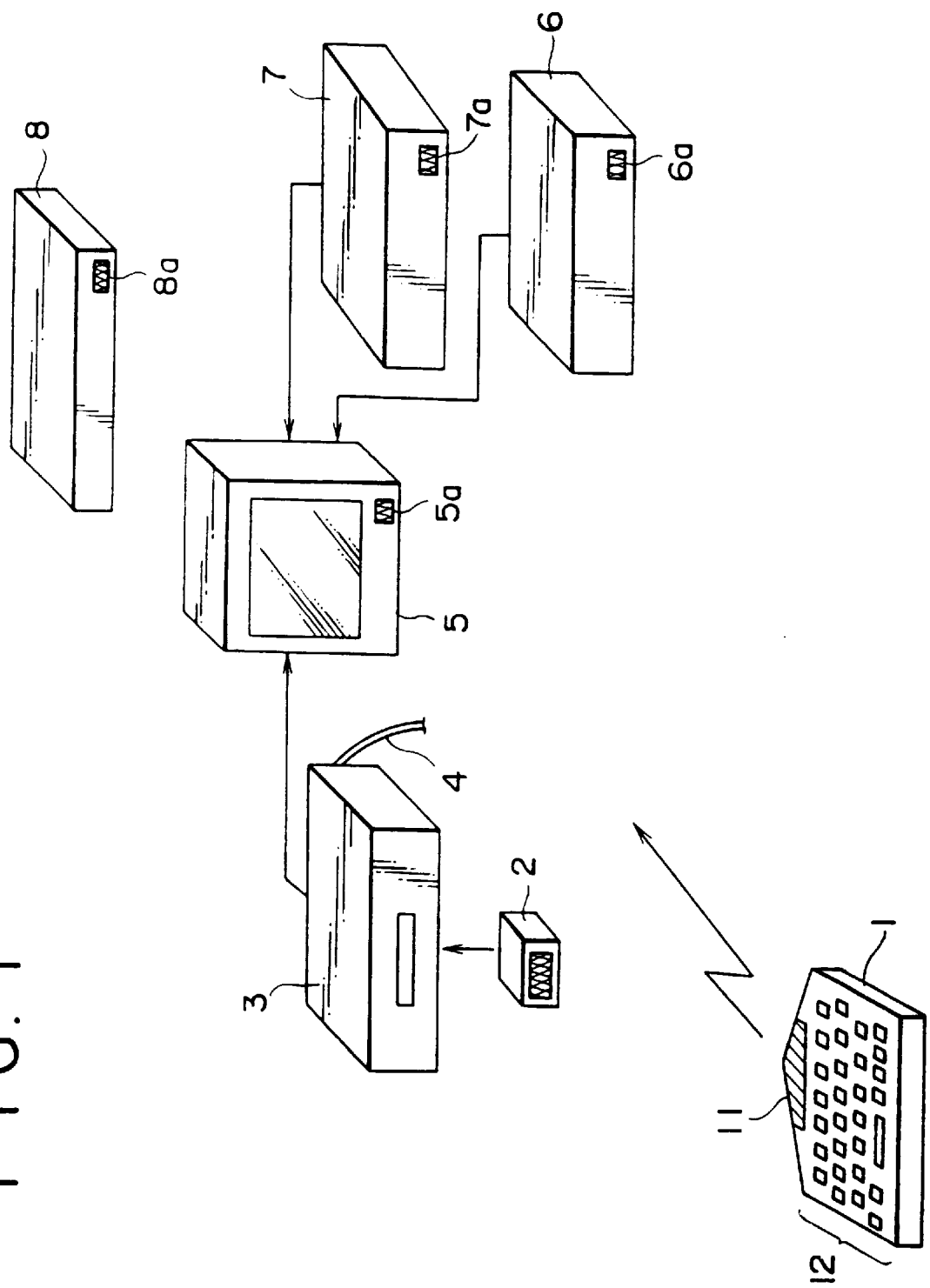
FIG. 1 is a view of a system configuration comprising an IR keyboard embodying the invention in connection with some peripheral devices.

FIG. 1 is a view of an input apparatus embodying the invention in combination with some peripheral devices. In FIG. 1, an IR keyboard 1 serving as the input apparatus comprises a key part 12 having a plurality of input keys, to be described later. Operating keys on the key part 12 produces key operation information. The information is sent as an infrared signal from a light-emitting part 11 of the keyboard to a light-receiving part 2 of a set-top box 3, constituting a first electronic device.

Operating keys on the key part 12 of the IR keyboard 1 also generate command information for controlling electronic devices. The devices to be controlled include such audio-visual (AV) equipment as a monitor device 5 (second electronic device), a video tape recorder (VTR) 6 and a tuner 7, as well as an air conditioner 8. The command information is transmitted to the respective devices from the light-emitting part 11 as infrared signals. The electronic devices 5 through 8 are provided respectively with light-receiving parts 5a through 8a for receiving the infrared signals.

The light-receiving part 2 receives the infrared signal from the IR, keyboard 1, decodes the received signal, and supplies the set-top box 3 with key operation information reflecting the key operations performed on the IR keyboard 1. In this example, the light-receiving part 2 is furnished separately from the set-top box 3. Alternatively, the light-receiving part 2 may be incorporated inside the set-top box 3.

The set-top box 3 may be a terminal connected via a telephone line 4 to commercial networks (handling E-mail, the WWW, etc.) or the Internet for electronic communication. The set-top box 3 may alternatively be a receiver that receives satellite broadcast and cable television transmissions. The set-top box 3 may also be a general-purpose disk player capable of playing back such disk media as the CD-ROM, Video-CD, Photo-CD, CD-DA (digital audio), DVD and CD-Plus. Equipped with GUI (Graphical User Interface), the set-top box 3 can output graphics and icons to the monitor device 5 for display.

Illustratively, where the set-top box 3 is capable of communicating over the Internet, the set-top box is offered various services including electronic mail and electronic news bulletins from servers, not shown, connected to the Internet as well as browsing over the WWW and what is known as electric commerce. Images representing these services are displayed on the monitor device 5. Watching the screen on the monitor device 5, a user may operate the IR keyboard 1 to control the set-top box 3.

Figure 2:
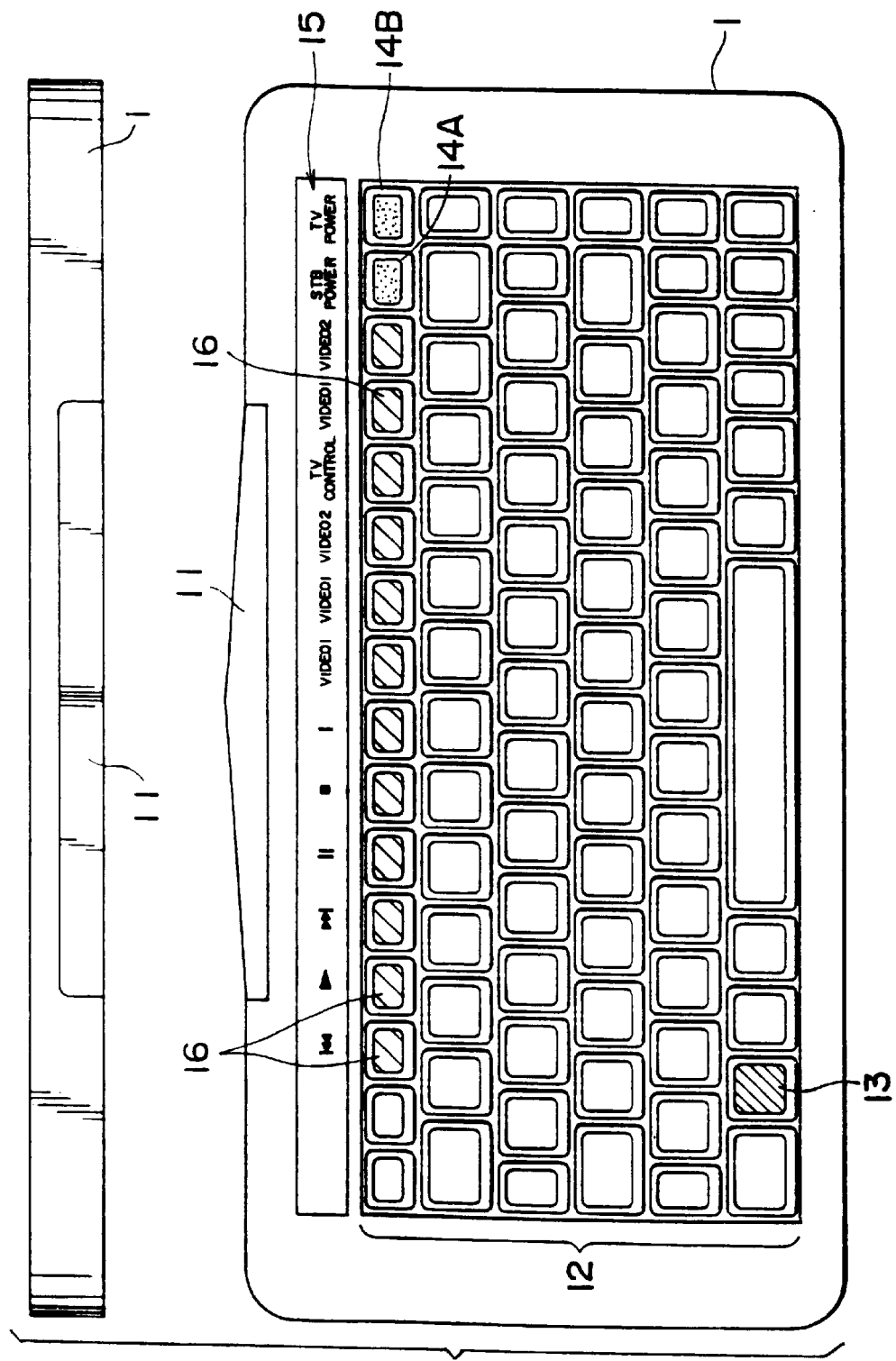
FIG. 2 is a view showing a typical structure of the inventive IR keyboard.

FIG. 2 is a combination of a plan view and a side view of the IR keyboard 1 in FIG. 1 embodying the invention, the side view showing the forward surface of the keyboard. As shown in FIG. 2, the IR keyboard 1 has the key part 12 with a plurality of input keys furnished thereon. The light-emitting part 11 for transmitting infrared signals is provided on the forward surface of the IR keyboard 1.

The key part 12 has a plurality of input keys for illustratively inputting key operation information comprising characters, numerals and symbols. When any input key is operated, a controller, not shown, generates key operation information representing the key operation. The generated information is transmitted from the light-emitting part 11 as an infrared signal.

In addition to the input keys for character, numeric and symbol entries, the key part 12 includes an AV function key 13 and two AV-dedicated keys 14A and 14B. The AV function key 13, when operated, causes part of the input keys on the key part 12 to function as AV keys 16 for inputting command information directed illustratively at the AV devices 5 through 7. The AV keys 16 may illustratively be assigned to the input keys in that key row of the key part 12 which is closest to a printed part 15 (the keys are shown hatched). With the AV function key 13 held down, operating any of the AV keys 16 causes the controller (not shown) to generate command information representing the key operation. The generated information is transmitted from the light-emitting part 11 as an infrared signal.

The two AV-dedicated keys 14A and 14B located to the right of the AV keys 16 need not be operated in conjunction with the AV function key 13. Operating the key 14A or 14B alone permits the input of command information to the AV devices 5 through 7. The AV-dedicated keys 14A and 14B are assigned to commands frequently used for the AV devices 5 through 7 shown in FIG. 1. Illustratively, the AV-dedicated key 14A acts as an input key to input a power-on/off command for the set-top box 3; the AV-dedicated key 14B serves as an input key to input a power-on/off command for the monitor device 5.

Immediately above the AV keys 16 and the AV-dedicated keys 14A and 14B on the panel is the printed part 15 that shows printed commands. On the IR keyboard 1 in FIG. 2, the AV keys 16 as well as the AV-dedicated keys 14A and 14B are assigned to commands for controlling the monitor device 5 and VTR 6. In this case, the printed part 15 has commands for the monitor device 5 and VTR 6 printed thereon, as illustrated.

On the IR keyboard 1 embodying the invention, as described, the key part 12 includes the AV function key 13, AV-dedicated keys 14A and 14B, and a plurality of AV keys 16. When operated in conjunction with the AV function key 13, any of the AV keys 16 acts as an input key to input a command for the AV devices 5 through 7. When any of the AV keys 16 is operated in combination with the AV function key 13 or when the AV-dedicated key 14A or 14B is operated alone, the light-emitting part 11 transmits an infrared signal representing command information for controlling the AV devices 5 through 7.

With input keys on the key part 12 operated, the IR keyboard 1 transmits not only key operation information to the set-top box 3 but also command information illustratively to the AV devices 5 through 7.

That is, in an AV system configured by connecting the set-top box 3 and AV devices 5 through 7 as shown in FIG. 1, the IR keyboard 1 embodying the invention is capable of controlling both the set-top box 3 and the AV devices 5 through 7. The setup eliminates the need for the user to perform complicated tasks of manipulating various remote controllers for the AV devices 5 through 7. The IR keyboard 1, when operated alone, may easily control the set-top box 3 and AV devices 5 through 7 making up the AV system.

Where the AV keys 16 and the AV-dedicated keys 14A and 14B are furnished in that key row of the key part 12 which is closest to the printed part 15, that means the printed part 15 having commands for the AV keys 16 and AV-dedicated keys 14A and 14B printed thereon are located close to the input keys on the panel. It follows that the commands can be printed on the panel without adding more inscriptions to the input keys that already bear a number of characters representing presently available functions. On the key part 12 thus arranged, the user may easily recognize the existing commands engraved on the input keys and the newly added commands.

Furthermore, the IR keyboard 1 embodying the invention need only undergo electrical changes that illustratively include adding command functions for controlling the AV devices 5 through 7. There is no need to modify the mechanical structure of the IR keyboard including its shape and input key arrangement. This means that the invention may be implemented at low costs.

The AV keys 16 assigned to the key part 12 serve as input keys to enter commands into the AV devices 5 through 7 only when these keys are operated in combination with the AV function key 13. This prevents the IR keyboard 1 from inadvertently transmitting command information to the AV devices 5 through 7.

Figure 3:
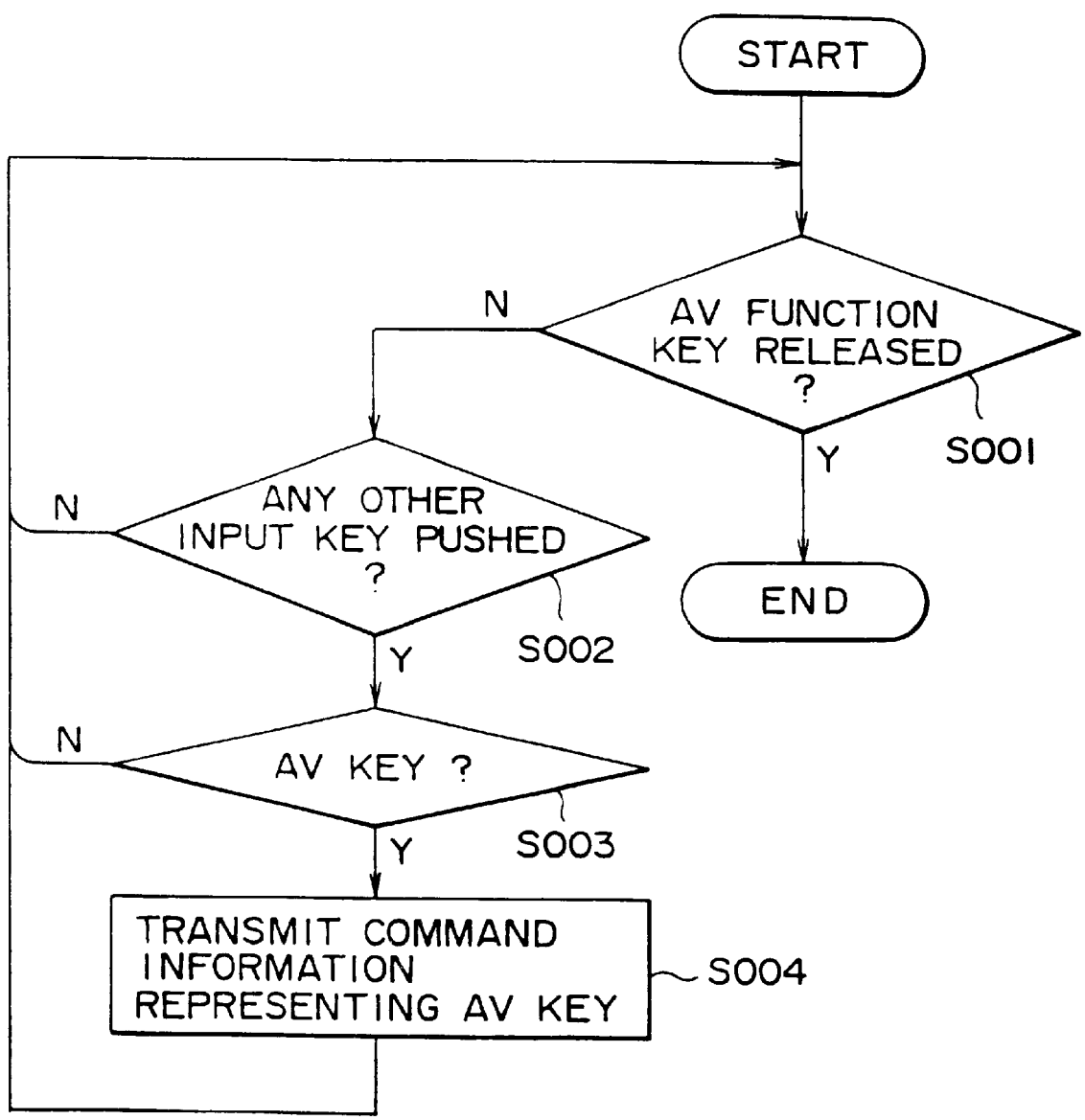
FIG. 3 is a flowchart of steps in which the IR keyboard 1 of FIG. 2 operates when its AV function key is pushed.

Described below with reference to the flowchart of FIG. 3 is how the controller operates when the AV function key 13 is pushed on the above-described IR keyboard 1. Pushing the AV function key 13 on the key part 12 causes the controller to enter step S001. In step S001, a check is made to see if the AV function key 13 is released. If the AV function key 13 is found to be held down in step S001, step S002 is reached.

In step S002, a check is made to see if any other input key than the AV function 13 is pushed on the key part 12. If any other input key is found to be pushed, step S003 is reached. If no other input key is found to be pushed in step S002, step S001 is reached again and the steps are repeated from there.

In step S003, a check is made to see if the input key found to be pushed in step S002 is an AV key 16. If the operated key is found to be an AV key 16, step S004 is reached. If the input key found to be pressed in step S002 is not an AV key 16, step S001 is reached again and the steps are repeated from there.

In step S004, the controller generates command information corresponding to the AV key 16 found to be operated in step S003 and transmits the generated information as an infrared signal from the light-emitting part 11. After transmission of the command information, step S001 is reached again and the steps are repeated from there. The process is continued until the AV function key 13 is found to be released in step S001.

Figure 4:
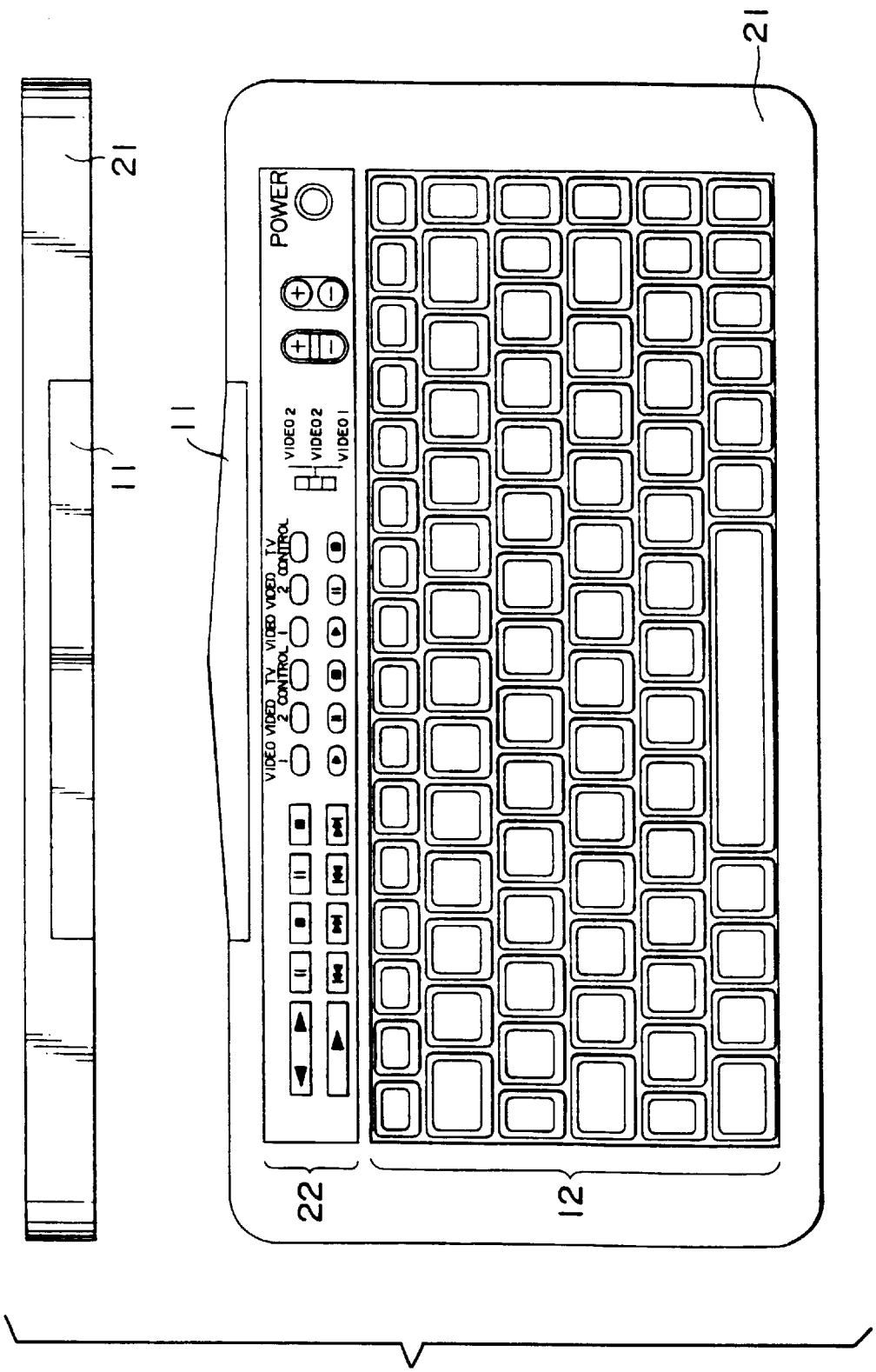
FIG. 4 is a view showing a typical structure of another IR keyboard embodying the invention.

FIG. 4 is a combination of a plan view and a side view of another IR keyboard embodying the invention, the side view showing the back of the keyboard. In FIG. 4, the IR keyboard 21 comprises a key part 12 having a plurality of input keys furnished thereon and AV control keys 22 provided separately from the key part 12. A light-emitting part 11 is provided on the forward surface of the IR keyboard 21.

The key part 12 has a plurality of input keys for illustratively inputting key operation information comprising characters, numerals and symbols. When any input key is operated, a controller, not shown, generates key operation information representing the key operation. The generated information is transmitted from the light-emitting part 11 as an infrared signal.

The AV control keys 22 include a plurality of input keys for inputting command information by which to control, say, the AV devices 5 through 7. Any of these input keys when operated causes the controller (not shown) to generate command information representing the key operation and to transmit the generated information from the light-emitting part 11 as an infrared signal.

On the IR keyboard 21 of the above constitution, the user operates only input keys among the AV control keys 22 to input commands illustratively for control of the AV devices 5 through 7. To input information for operating the set-top box 3, the user simply operates input keys on the key part 12.

Such simplified procedures allow the user easily to control the set-top box 3 and AV devices 5 through 7 making up the AV system.

Figure 5:
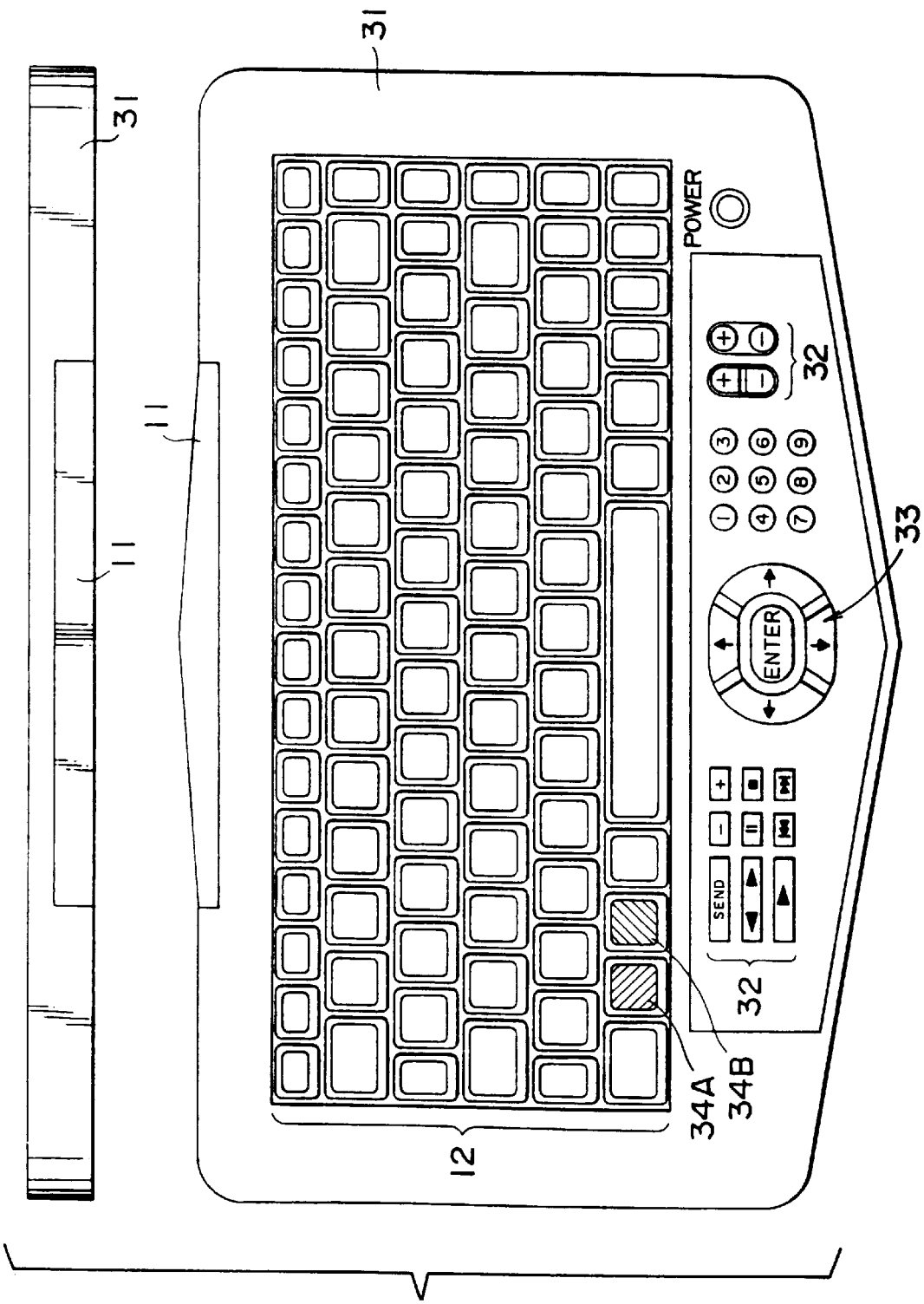
FIG. 5 is a view showing a typical structure of another IR keyboard embodying the invention.

FIG. 5 is a combination of a plan view and a side view of another IR keyboard embodying the invention, the side view showing the back of the keyboard. In FIG. 5, the IR keyboard 31 comprises a key part 12 made up of a plurality of input keys, as well as AV control keys 32 and cursor control keys 33 furnished separately from the key part 12. A light-emitting part 11 is provided on the forward surface of the IR keyboard 31.

The AV control keys 32 include a plurality of input keys for inputting command information by which to control, say, the AV devices 5 through 7. The cursor control keys 33 include cursor movement keys and a enter key for controlling graphics and icons displayed on the monitor device 5. When any cursor control key is operated, a controller, not shown, generates command information corresponding to the key operation and transmits the generated information from the light-emitting part 11 as an infrared signal.

The key part 12 comprises two function keys 34A and 34B that may be set illustratively by the user. With the user-set function key 34A or 34B held down, operating any other input key generates command information that controls the AV devices 5 through 7 or the air conditioner 8. The generated information is transmitted from the light-emitting part 11 as an infrared signal.

On the IR keyboard 31 of the above constitution, the user operates only input keys among the AV control keys 32 to input commands illustratively for control of the AV devices 5 through 7. To input information for operating the set-top box 3, the user simply operates the AV control keys 32. These simplified operations allow the user easily to control the set-top box 3 and AV devices 5 through 7 making up the AV system.

The cursor control keys 33 make it possible for the user at the IR keyboard 31 to control displayed graphics and icons. Such graphics and icons used to be controlled only with dedicated remote controllers of the AV devices 5 through 7. With such functions, the keyboard is easier and more convenient to use than before.

The function keys 34A and 34B which may be set by the user are included in the key part 12. Input keys on the key part 12 may be used to input commands by which to control, say, the AV devices 5 through 7 or the air conditioner 8; the user need only operate the function key 34A or 34B together with appropriate user-selected input keys. Input keys on the key part 12 thus function either as command input keys apart from the AV control keys 32, or as input keys to control the air conditioner 8 separately from the AV devices 5 through 7. In this manner, a growing number of electronic devices are controlled by the IR keyboard.

Figure 6:
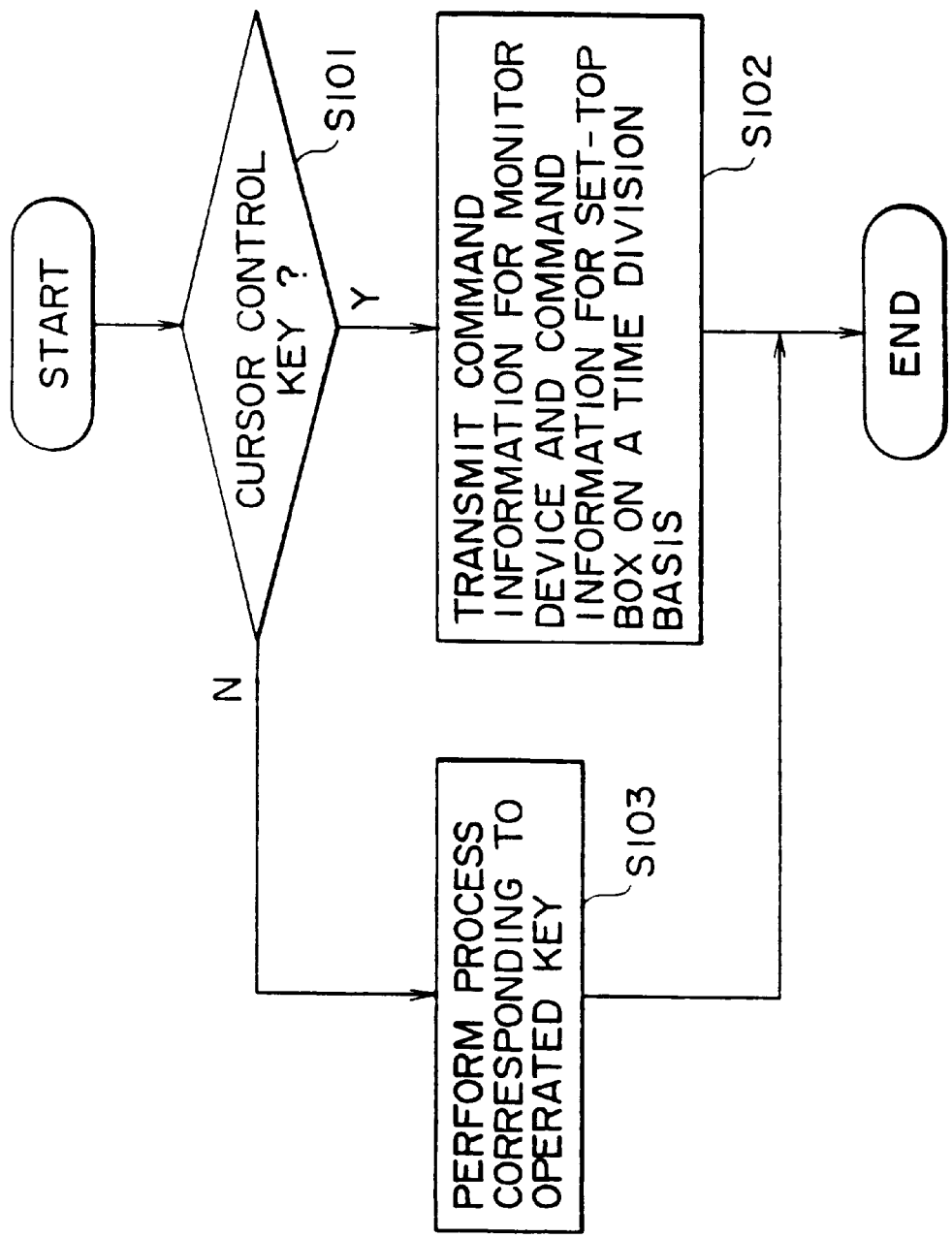
FIG. 6 is a flowchart of steps in which the IR keyboard of FIG. 5 operates when its cursor control key is pushed.

Described below with reference to the flowchart of FIG. 6 is how the controller operates when the cursor control keys 33 are manipulated on the above-described IR keyboard 31 shown in FIG. 5. Pushing any input key on the IR keyboard 31 causes the controller to enter step S101. In step S101, a check is made to see if the operated input key is a cursor control key 33. If a cursor control key 33 is found to be pushed in step S101, step S102 is reached.

In step S102, the controller outputs command information corresponding to the operated cursor control key 33 from the light-emitting part 11. The command information is output on a time division basis either for controlling the monitor device on which to display graphics and icons, or for controlling the set-top box 3 that outputs graphics and icons.

If no cursor control key 33 is found to be operated in step S101, step S103 is reached. In step S103, a process corresponding to the operated key is carried out. Specifically, if any input key on the key part 12 is operated, the controller causes the light-emitting part 11 to transmit key operation information corresponding to the operated input key; if any input key among the AV control keys 32 is operated, the light-emitting part 11 is controlled to output command information representing the operated input key.

Figure 7:
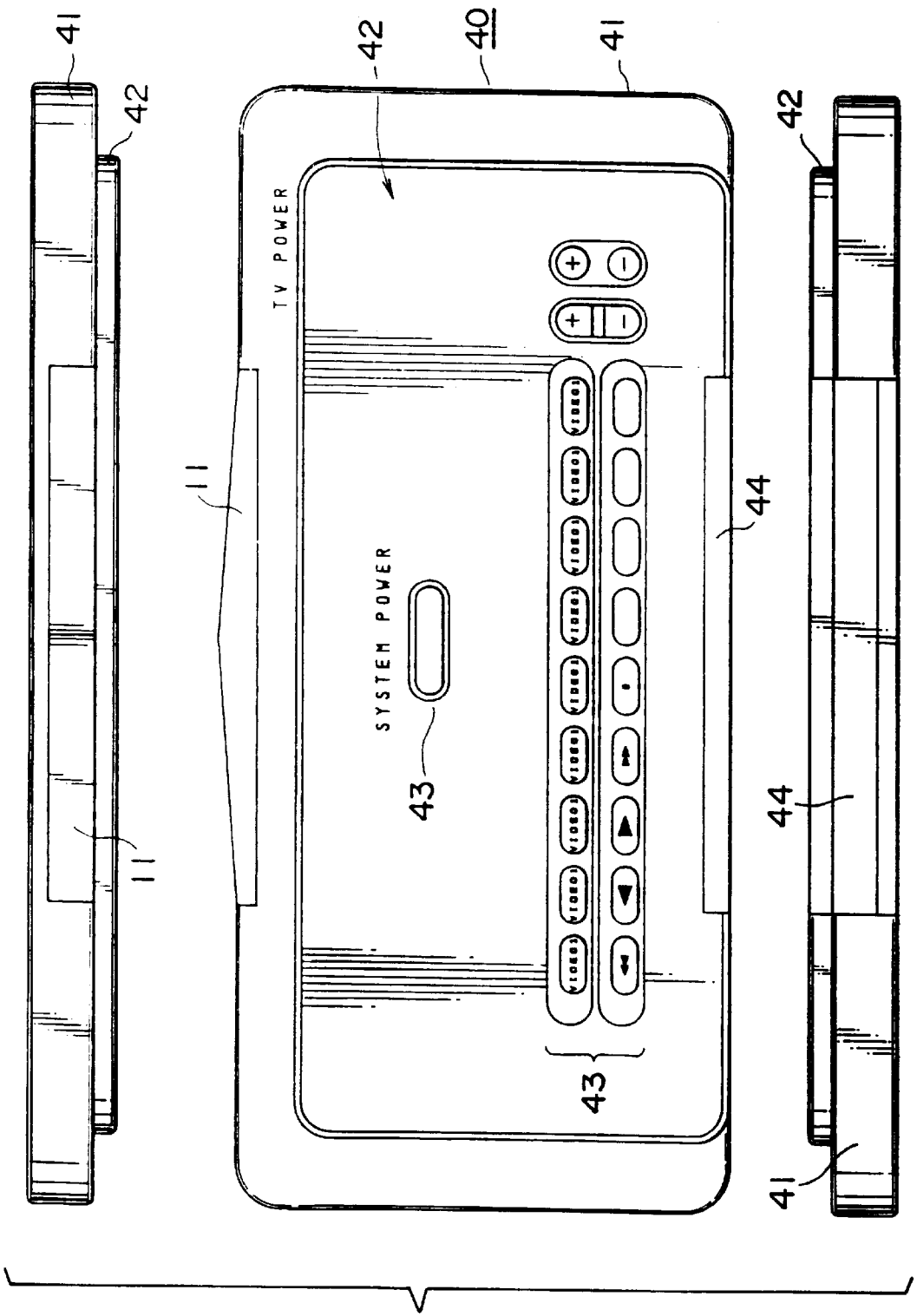
FIG. 7 is a view showing a typical structure of another IR keyboard embodying the invention.

FIG. 7 is a combination of a plan view, a side view and a front side view of another IR keyboard embodying the invention. The IR keyboard 40 in FIG. 7 comprises a keyboard body 41 and a keyboard cover 42 that protects the keyboard body 41. A key part 12 is furnished on top of the keyboard body 41. The keyboard cover 42 is provided with AV control keys 43 for control of the AV devices 5 through 7. The edge of the keyboard body 41 and that of the keyboard cover 42 closest to the user are coupled rotatably with a hinge 44 or the like interposed therebetween.

Figure 8:
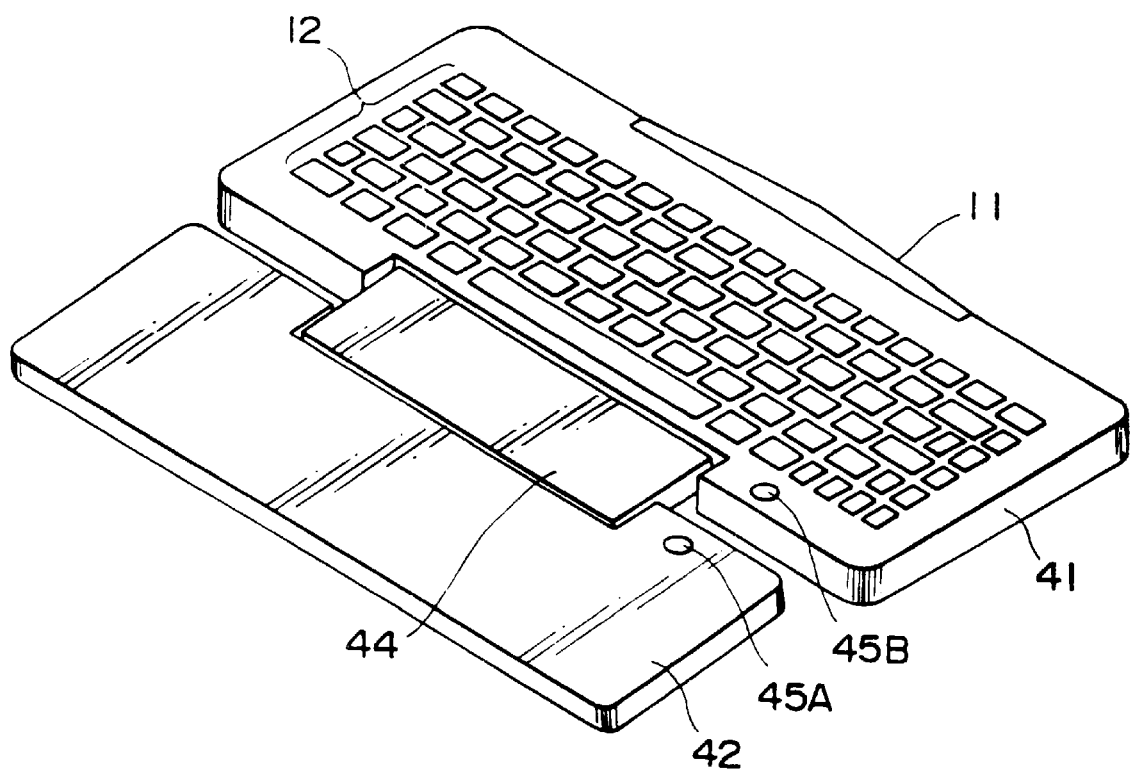
FIG. 8 is a perspective view of the IR keyboard of FIG. 7 with its keyboard cover opened.

FIG. 8 is a perspective view showing the keyboard cover 42 opened from the IR keyboard 40 indicated in FIG. 7. As shown in FIG. 8, the key part 12 is located on top of the keyboard body 41 that is exposed when the keyboard cover 42 is opened. The keyboard cover 42 and keyboard body 41 are furnished respectively with detectors 45A and 45B constituting a sensor. The detectors 45A and 45B are made of switches that are illustratively turned on when the keyboard cover 42 is closed and turned off when the cover is opened.

FIGS. 9A through 9D are views showing how the keyboard cover 42 is swung pivotably on the IR keyboard 40. The keyboard cover 42 is opened from its closed position as follows: as it is opened, the keyboard cover 42 starts to turn on the hinge 44 that couples the cover 42 to the keyboard body 41. The cover 42 is swung open consecutively as shown in FIGS. 9A, 9B, 9C and 9D, in that order. Eventually, the keyboard cover 42 is opened up to the lower side of the keyboard body 41.

On the IR keyboard 40 of the above constitution, as described, the keyboard body 41 includes the key part 12 and the keyboard cover 42 has the AV control keys 43. Thus opening and closing the keyboard cover 42 affords the user a clearly distinguished choice of operating either input keys on the key part 12 or the AV control keys 43.

With the AV control keys 43 located on the keyboard cover 42, the keyboard of FIG. 7 provides more space in which to furnish the keys 43 than the previously described keyboards of FIGS. 2 through 5. The wider space allows the AV control keys 43 to be shaped and located more freely than before. This in turn helps create an IR keyboard that is easier and more convenient to operate.

The detectors 45A and 45B for detecting the opened and closed states of the keyboard cover 42 forestall inadvertent transmission of command information from the IR keyboard 40, illustratively in two cases: when any AV control key 43 is operated accidentally while the keyboard cover 42 is being opened, and when the keyboard is being closed with an obstacle left interposed between the keyboard body 41 and the keyboard cover 42.

The structure in which the edge of the keyboard body 41 and that of the keyboard cover 42 are coupled rotatably with the hinge 44 interposed therebetween offers the following advantage: if the user inadvertently opens or closes the keyboard cover 42 while the light-emitting part 11 is sending an infrared signal reflecting the operation of either the key part 12 on the keyboard body 41 or any AV control key 43 on the keyboard cover 42, the infrared signal being transmitted will not be shielded.

Figure 10:
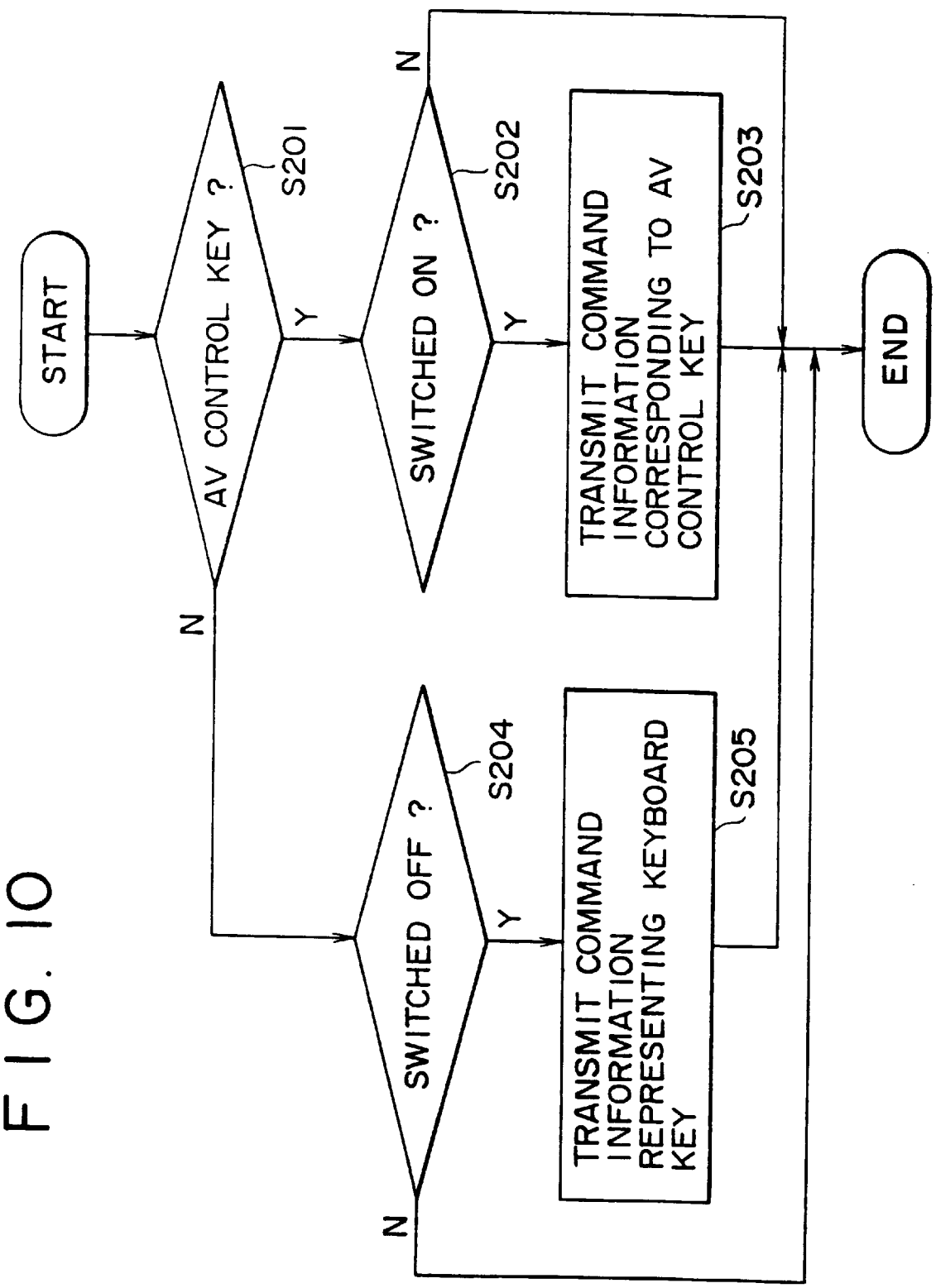
FIG. 10 is a flowchart of steps in which the IR keyboard of FIG. 7 operates.

Described below with reference to the flowchart of FIG. 10 is how the controller operates when input keys are operated on the above-described IR keyboard 40 shown in FIG. 7. Pushing any input key on the key part 12 of the IR keyboard 40 or any AV control key 43 causes the controller to enter step S201. In step S201, a check is made to see if the operated input key is an AV control key 43. If an AV control key 43 is found to be pushed in step S201, step S202 is reached.

In step S202, a check is made to see if the detectors 45 for detecting the opened and closed states of the keyboard cover 42 relative to the keyboard body 41 are switched on. If the detectors 45 are found to be switched on (i.e., keyboard cover 42 is closed), step S203 is reached. In step S203, the controller transmits command information corresponding to the operated AV control key 43 and terminates the process.

If the detectors 45 are found to be switched off in step S202 (i.e., keyboard cover 42 is opened), the controller judges that the AV control key 43 is inadvertently operated. In that case, the controller terminates the process without transmitting command information representing the operation of the AV control key 43.

If no AV control key 43 is found to be operated in step S201, i.e., if any input key on the key part 12 of the keyboard body 41 is input, then step S204 is reached.

In step S204, a check is made to see if the sensor 45 for detecting the opened and closed states of the keyboard cover 42 relative to the keyboard body 41 is switched off. If the sensor 45 is found to be switched off (i.e., keyboard cover 42 is opened), step S205 is reached. In step S205, the controller transmits command information corresponding to the operated input key on the keyboard body 41 and terminates the process.

If the sensor 45 is found to be switched on in step S204, i.e., if the keyboard cover 42 is found to be closed despite the fact that an input key on the key part 12 of the keyboard body 41 is operated, then the controller judges that the input key on the key part 12 is erroneously operated. In that case, the controller terminates the process without transmitting command information representing the operated input key on the keyboard body 41.

Figure 11:
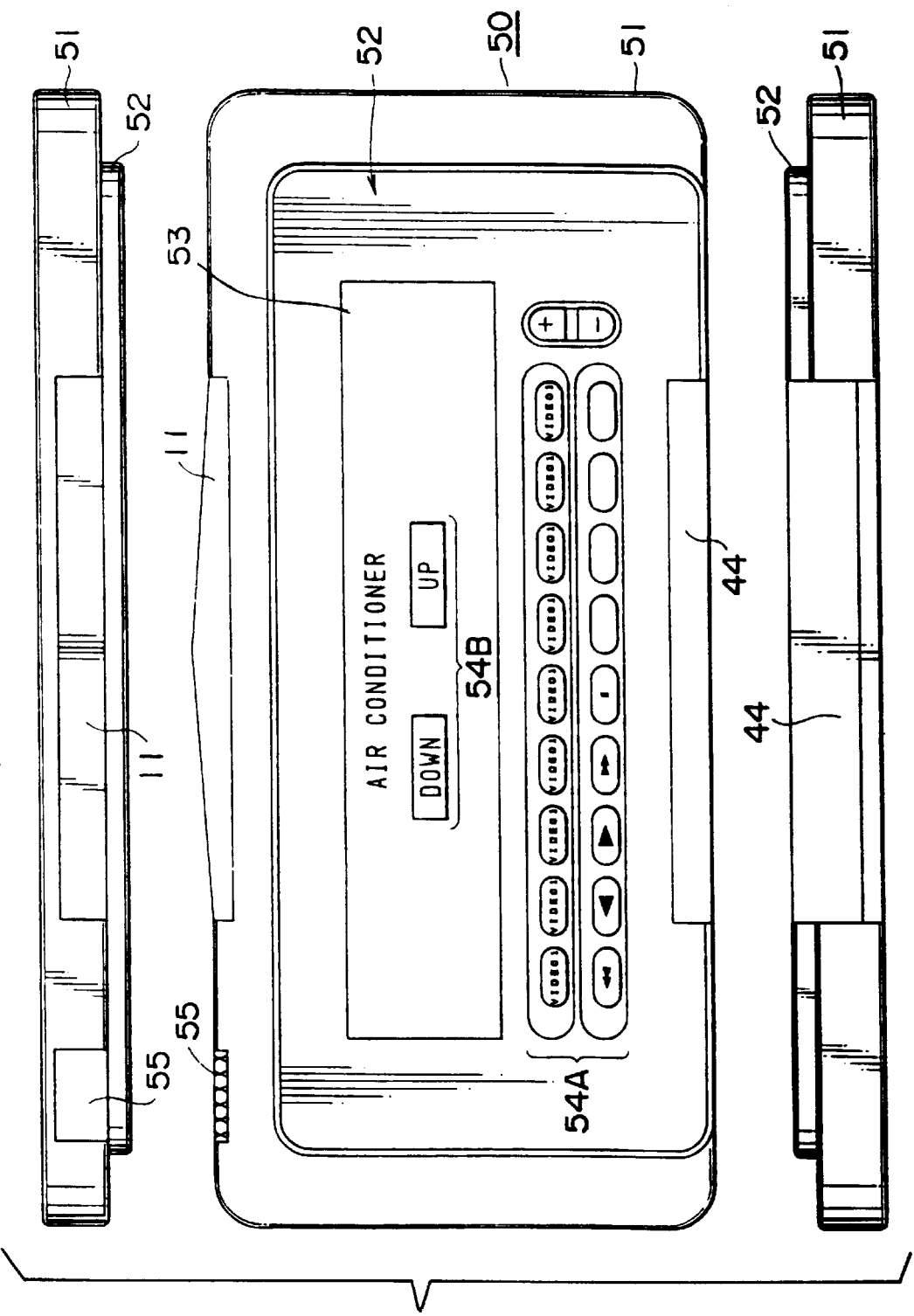
FIG. 11 is a view showing a typical structure of another IR keyboard embodying the invention.

FIG. 11 is a combination of a plan view, a back side view and a front side view of another IR keyboard embodying the invention. The IR keyboard 50 in FIG. 11 comprises a keyboard body 51 and a keyboard cover 52 for protecting a key part 12, not shown, furnished on top of the keyboard body 51.

A light-emitting part 11 and a light-receiving part 55 are provided on the forward surface of the keyboard body 51. The light-receiving part 55 receives infrared signals that are transmitted by electronic devices capable of effecting such signal transmission. Where the IR keyboard 50 needs command information that it does not possess, the keyboard may use what is known as a learning function, receiving the information through the light-receiving part 55 from a remote controller positioned opposite to the part 55.

As with the keyboard cover 42 of the IR keyboard 40 in FIG. 7, the keyboard cover 52 is attached pivotably to the keyboard body 51 with a hinge 44 or the like interposed therebetween. The top of the keyboard cover 52 may illustratively comprise AV control keys 43A and a liquid crystal display 53 (simply called the display hereunder).

The display 53 is capable of displaying various settings received illustratively through the light-receiving part 55.

The display 53 can also display control keys 54B that may be operated to control illustratively the air conditioner 8. Touching the control keys 54B with a fingertip allows the air conditioner 8 to be set for a desired temperature and to be otherwise controlled.

The IR keyboard 50 of the above constitution makes it possible to control with ease a wide range of devices including the AV devices 5 through 7 as well as other household electronic devices such as the air conditioner 8. The IR keyboard 50 is also capable of controlling an overall household control system including AV system and security devices.

Figure 12:
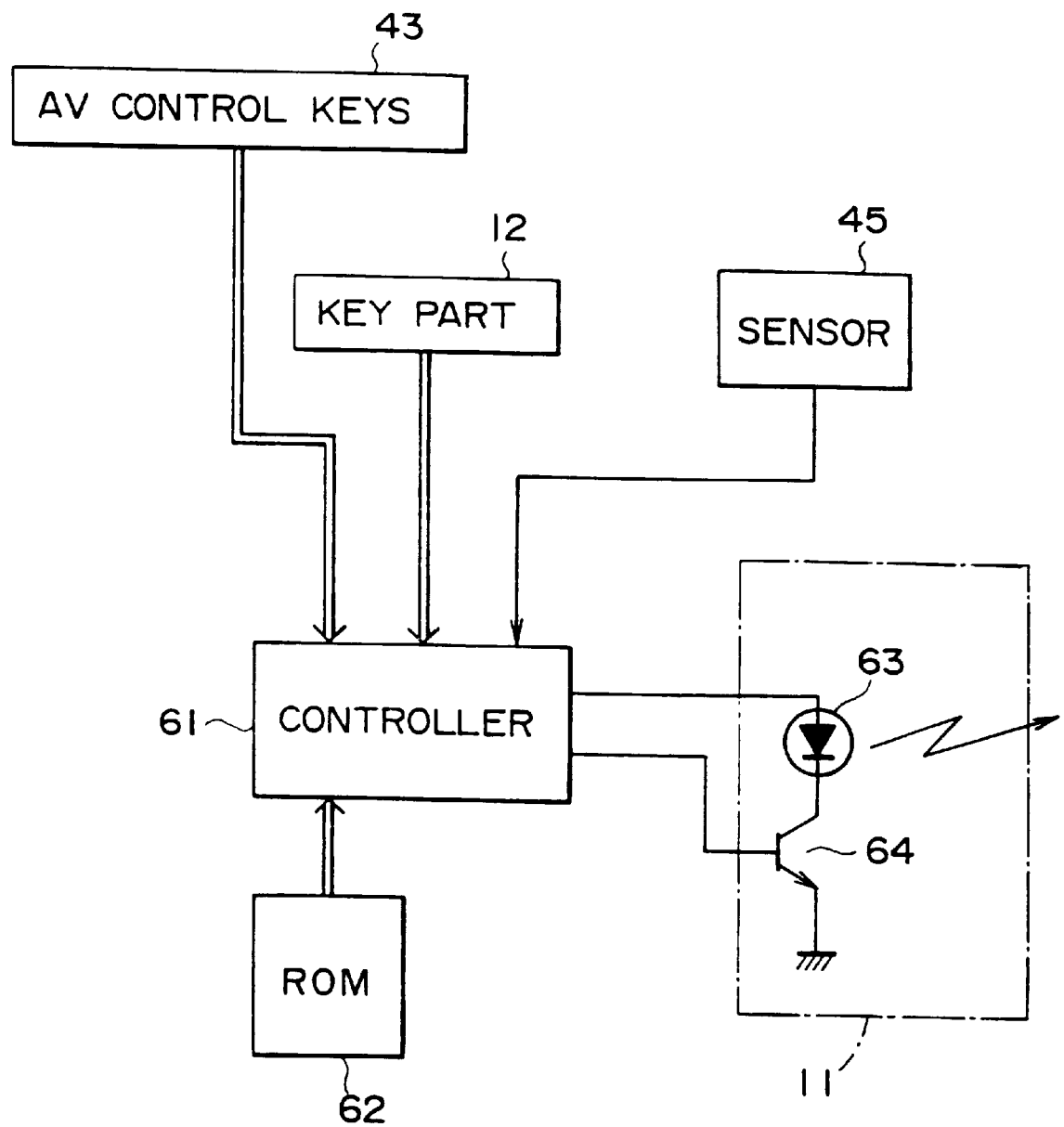
FIG. 12 is a schematic block diagram outlining a circuit block constitution of the inventive IR keyboard.

A typical circuit block constitution of the IR keyboard above will now be described with reference to FIG. 12. FIG. 12 is a schematic block diagram outlining the circuit block constitution of the IR keyboard 40 shown in FIG. 7. As illustrated in FIG. 12, the IR keyboard 40 comprises a key part 12, AV control keys 43, a sensor 45, a controller 61, a ROM 62 and a light-emitting part 11. The key part 12 having a plurality of operation keys arranged in matrix fashion and the AV control keys 43 on the keyboard cover 42 supply the controller 61, when operated, with signals representing the operated keys on a time a division basis. Given the signal from the key part 12 or from any AV control key 43, the controller 61 reads from the ROM 62 a key code or a command code corresponding to the currently operated key.

If a key code corresponding to the key part 12 is retrieved from the ROM 62, the controller 61 generates key code information based on a transmission format, to be described later. If a command code representing an AV control key 43 is read from the ROM 62, the controller 61 generates command information based on a transmission format that complies with the AV devices 5 through 7 to be controlled by the AV control keys 43. On the basis of the key code information or command information thus generated, the controller 61 controls activation and deactivation of a transistor 64 of a light-emitting diode 63 to transmit an infrared signal.

The controller 61 continuously detects the opened and closed states of the keyboard cover 42 on the IR keyboard 40 through the use of a detection signal from the sensor 45 that senses how the cover is positioned. Using the detection signal, the controller 61 keeps verifying that any input key on the key part 12 or an AV control key 43 is inadvertently pushed down.

In the keyboard constitution above, it is assumed that the ROM 62 contains key codes corresponding to key operation information fed from the key part 12 as well as command codes corresponding to key operation information coming from the AV control keys 43.

FIG. 13 is a table that lists typical key codes representing key operation information from the key part 12. This key code example applies to a Japanese language keyboard. In FIG. 13, key numbers 1 through 127 are shown in the leftmost column. The column in the middle indicates characters/symbols that are actually engraved on the keys corresponding to the key numbers. The rightmost column contains hexadecimal key codes corresponding to the key numbers and the engraved characters/symbols.

According to the table in FIG. 13, if the user operates a key with "ESC" engraved thereon, then the controller 61 reads a key code "01" from the address having a key number 1 in the ROM 62. The key code thus retrieved is transmitted illustratively in accordance with a transmission format to be described later.

Described below with reference to FIGS. 14, 15A through 15C, 16A and 16B is a typical format in which signals are transmitted from the IR keyboard 40 to the set-top box 3. The format described below is one in which signals are sent from the IR keyboard 40 to the set-top box 3 only when any input key on the key part 12 is operated. Where the IR keyboard 40 is to transmit a signal to any of the AV devices 5 through 7, the corresponding command code needs to be sent in a format that complies with the AV device in question. It is assumed that appropriate identification information for identifying the IR keyboard 40 is already set in the set-top box 3.

Figure 14:
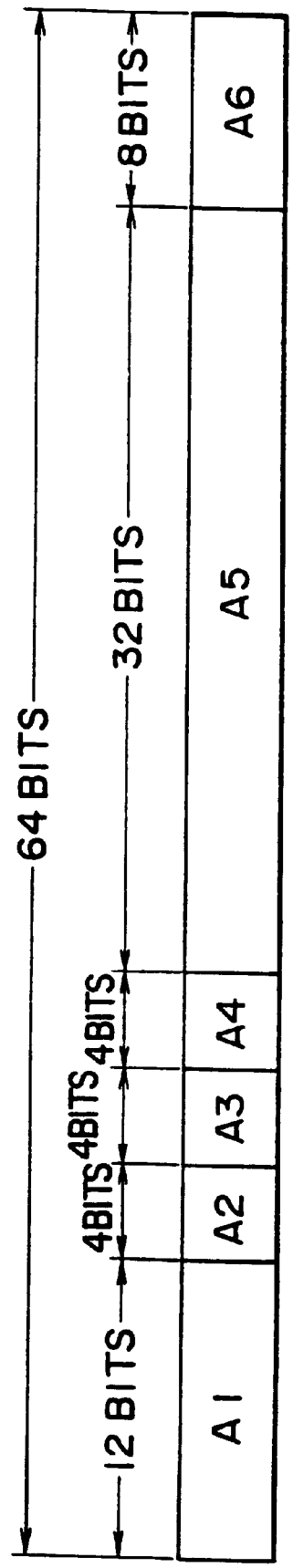
FIG. 14 is a conceptual view showing a typical data structure of a packet for use with the embodiments of the invention.

The signal transmitted from the IR keyboard 40 to the set-top box 3 is made up of a series of consecutive data units called packets each having a fixed length. FIG. 14 shows a data structure of one such packet. As shown in FIG. 14, one packet has 64 bits comprising illustratively a manufacturer ID code area A1, a keyboard ID code area A2, an identical keyboard ID code area A3, a data ID code area A4, a data area A5 and a parity area A6.

The manufacturer ID code area A1, 12 bits long, is a code area that causes the set-top box 3 to identify the manufacturer of the IR keyboard 40. The keyboard ID code area A2, four bits long, is a code area that causes the set-top box 3 to identify the IR keyboard 40. The identical keyboard ID code area A3, also four bits long, is a code area that causes the set-top box 3 to identify a specific IR keyboard 40 apart from other IR keyboards 40 of the same type. The data ID code area A4 is another four-bit code area that causes the set-top box 3 to identify the type of the data held in the data area.

The data area A5, 32 bits long, is an area that is assigned a key code representing the operated key. The parity area A6, eight bits long, is the last area in the packet which contains parity data.

Figures 15A, 15B, 15C:
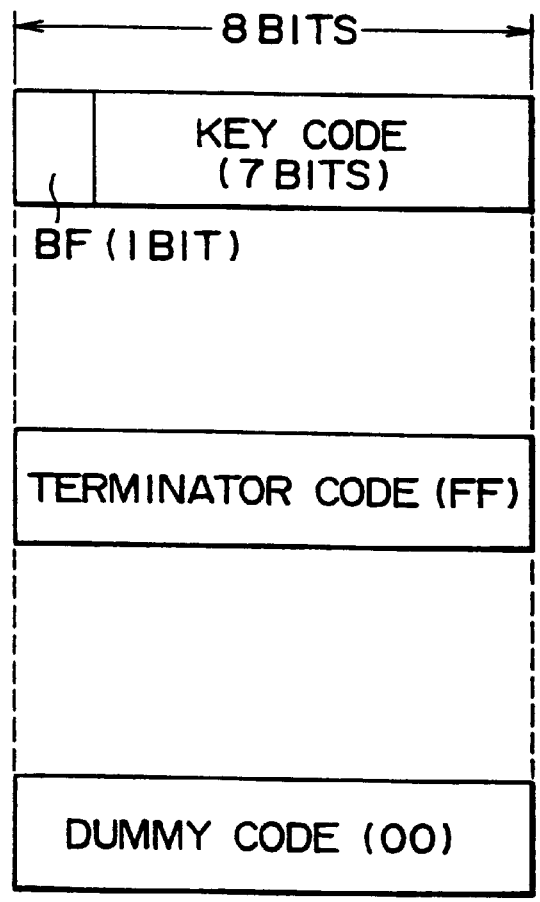
FIGS. 15A through 15C are conceptual views illustrating data blocks constituting a data area for use with the embodiments of the invention.

FIGS. 15A, 15B and 15C show in more detail the 32-bit data area A5 included in FIG. 14. Three data blocks, eight bits long each, constitute the data area in accordance with a format to be described later. FIG. 15A indicates a break flag BF and a key code making up one data block. The break flag BF is one bit long, followed by a seven-bit key code area. In this example, the seven-bit key code area is set with the key code of the actually operated key (see FIG. 13). The break flag BF is set to "0" while the key operation indicated by the data in the ensuing key code area is continued. When the key is released, the break flag BF is set to "1". FIG. 15B shows a terminator code. This is a code that indicates the end of at least one key code representing the currently operated key. The terminator code may be "FF" in hexadecimal. FIG. 15C shows a dummy code. A dummy code is used when, within the data area A5 of a packet, the terminator code is followed by superfluous regions. The dummy code may be "00" in hexadecimal.

Figures 16A, 16B:
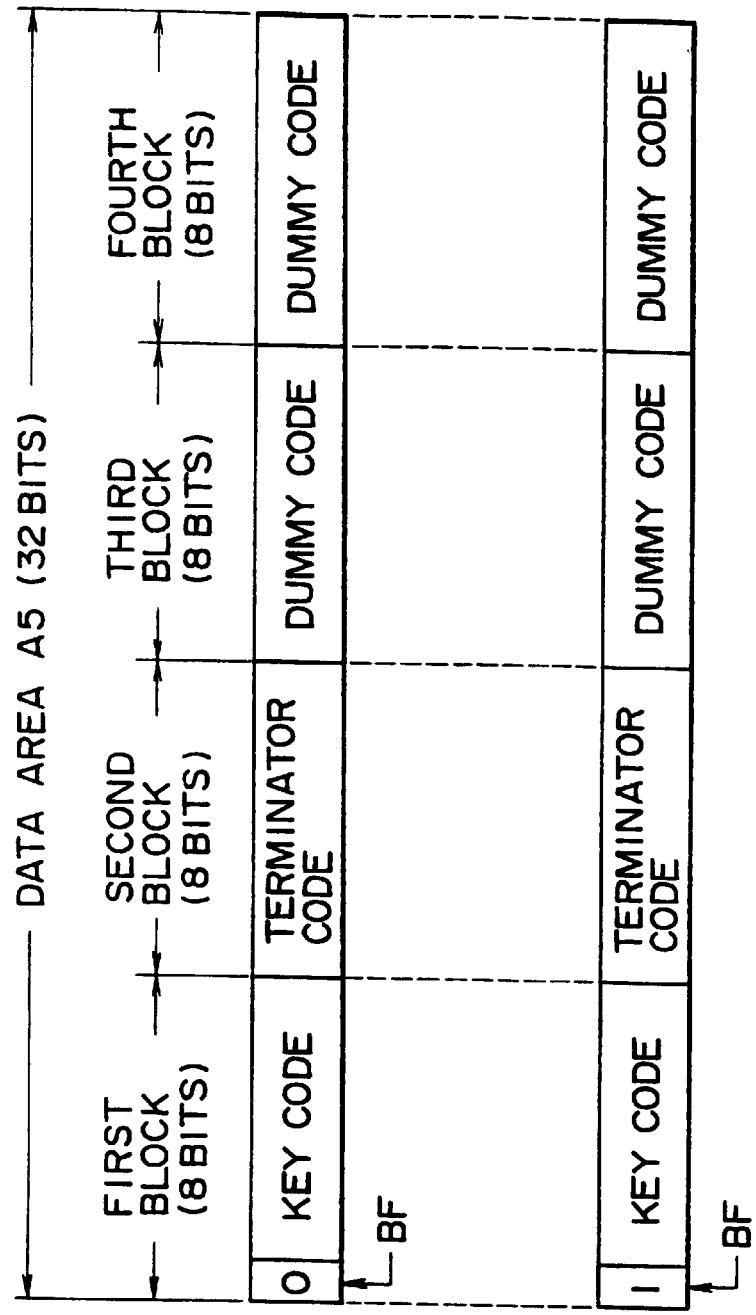
FIGS. 16A and 16B are conceptual views depicting a typical data structure of a signal transmitted when an input key on the inventive keyboard is operated.

Described below with reference to FIGS. 16A and 16B is a data structure acquired by use of the above-described data transmission format when any one key is operated. Of the component areas constituting one packet in FIG. 14, only the data area A5 is shown in FIGS. 16A and 16B, and the other areas are omitted.

Suppose that the user operates part 12 of the key part 12 of the IR keyboard 40. In that case, as shown in FIG. 16A, the first eight-bit block in the 32-bit data area A5 is set with a break flag BF and a key code. It is assumed that the seven-bit key code area accommodates a key code corresponding to the key currently operated by the user. As long as the key is being operated, the break flag BF is set with "0".

The second block (8 bits long) in the data area contains a terminator code that indicates the end of the key code corresponding to the currently operated key. The terminator code allows the receiving side (i.e., set-top box 3) to recognize that only one key designated by the first block is currently operated. In this case, the third and the fourth blocks (8 bits each) that follow are set with dummy codes filling the excess regions in the data area A5.

While the key is being operated, data packets such as the one in FIG. 16A are transmitted consecutively from the IR keyboard 40, each packet including the data area A5 formed as described above.

When the user releases the key that was depressed, the break flag BF in the first block is set to "1" as shown in FIG. 16B. That is, the block in question is transmitted together with a flag indicating the release of the key. At the end of data transmission using the data structure shown in FIG. 16B, the IR keyboard 40 terminates its transmission operation, and enters a standby state to wait for another key to be operated.

If the user operates two keys concurrently (not shown), the first block in the data area A5 is set with a break flag BF corresponding to the key that was pressed first, and the second block is set with a break flag representing the key operated later. The third block in the data area is set with a terminator code, and the fourth block is filled with a dummy code. Data packets such as the one containing the data area A5 formed as described are transmitted consecutively.

If three keys are operated concurrently, the first through the third blocks have their break flags BF and their key codes set in the order in which the corresponding keys were pressed, and the fourth block is set with a terminator code. In that case, the first through the fourth blocks have no dummy codes since they are occupied by the break flags BF, key codes and terminator code. Then data packets such as the one containing the data area A5 formed as described are transmitted consecutively.

If one of a plurality of concurrently operated keys is released, the break flag BF of the key code corresponding to the released key is set to "1." The break flag BF and key code in question are then omitted. The key codes representing the still operated keys are supplemented with a terminator code, and the consecutive transmission of data packets continues. Releasing one of two concurrently operated keys brings about the above-described state in which one key is operated. That is, data packets each containing the data area A5 shown in FIG. 16A are transmitted.

The transmission format above has been described only for illustrative purposes. Any other suitable communication format may be utilized alternatively.

As described, the input apparatus according to the invention comprises the first operation key part for operating the first electronic device, the second operation key part for operating the second electronic device, and the control means. When the first operation key is operated, the control means generates operation information for the first electronic device. With any control key on the control key part operated, pushing any operation key on the second operation key part causes the control means to generate operation information for the second electronic device. In that manner, the first and second electronic devices are operated.

The inventive input apparatus may include the third operation key part for operating the second electronic device. Pushing any operation key on the third operation key part causes the control means to generate operation information for the second electronic device. This structure makes it possible to control the first and the second electronic devices with simple operations.

Furthermore, the input apparatus according to the invention may have the first operation key part for operating the first electronic device furnished separately from the second operation key part for operating the second electronic device. This structure also allows the first and the second electronic devices to be controlled with simplified operations.

The inventive input apparatus may have the first operation key part for operating the first electronic device furnished separately from the second operation key part for operating the second electronic device, supplemented with the cursor operation keys to operate the first and the second electronic devices. Whereas graphics and icons displayed for the electronic devices used to be controlled using only their dedicated remote controllers, the inventive input apparatus takes over graphics and icon manipulations. This structure renders the input apparatus more convenient than before.

The input apparatus according to the invention may have the first operation key part for operating the first electronic device mounted on a base part and have the second operation key part for controlling the second electronic device furnished on a cover part. This structure allows the user to make clearly distinguished use of keys on the first and the second operation key parts. As a result, the input apparatus is made more convenient to use than ever.

As many apparently different embodiments of this invention may be made without departing from the spirit and scope thereof, it is to be understood that the invention is not limited to the specific embodiments thereof except as defined in the appended claims.

What is claimed is:

1. An input apparatus comprising:

a base;

a first operation key part having a plurality of operation keys formed on said base;

a cover part hingedly attached to said base for covering said first operation key part when set to a first position and for exposing said first operation part when set to a second position located under said base;

a second operation part having a plurality of second operation keys and attached to said cover part so as to be exposed when said cover part is set to said first position;

control means for generating operation information for a first electronic device when any of said first operation keys of said first operation key part is operated and for generating operation information for a second electronic device when any of said second operation keys of said second operation key part is operated;

transmission means for transmitting the operation information generated by said control means; and means for determining whether said cover part is set to said first position or to said second position, wherein, if said position determination means has determined that said cover part is set to said first position, said control means does not generate operation information in response to any of said first operation keys of said first operation key part being operated and only generates operation information in response to any of said second operation keys of said second operation key part being operated, and wherein, if said position determination means has determined that said cover part is set to said second position, said control means does not generate operation information in response to any of said second operation keys of said second operation key part being operated and only generates operation information in response to any of said first operation keys of said first operation key part being operated.

2. The input apparatus according to claim 1, where said control means generates operation information for said first electronic device and operation information for said second electronic device alternately on a time division basis when any of said cursor operation keys is operated.

3. The input apparatus according to claim 1, wherein said transmission means is attached to one edge of said base, and further comprising a hinge, whereby said cover part is hingedly mounted on another edge of said base.

4. The input apparatus according to claim 1, wherein said transmission means includes means for transmitting said operation information as an infrared signal.

* * * * *